(12) United States Patent
Fiore, Jr. et al.

(10) Patent No.: US 8,113,579 B2
(45) Date of Patent: Feb. 14, 2012

(54) CHILD SAFETY SEAT

(75) Inventors: Joseph F. Fiore, Jr., Central (HK); Fang-Ming Li, Central (HK)

(73) Assignee: Wonderland Nurserygoods Company Limited, Central (HK)

( * ) Notice: Subject to any disclaimer, the term of this patent is extended or adjusted under 35 U.S.C. 154(b) by 282 days.

(21) Appl. No.: 12/538,157

(22) Filed: Aug. 9, 2009

(65) Prior Publication Data

US 2010/0038941 A1 Feb. 18, 2010

Related U.S. Application Data

(60) Provisional application No. 61/141,227, filed on Dec. 29, 2008, provisional application No. 61/188,721, filed on Aug. 12, 2008.

(51) Int. Cl.
*A47C 31/00* (2006.01)

(52) U.S. Cl. .................. 297/217.6; 362/249.03; 362/131

(58) Field of Classification Search ............... 297/217.6; 362/249.03, 249.07, 131
See application file for complete search history.

(56) References Cited

U.S. PATENT DOCUMENTS

| | | | | |
|---|---|---|---|---|
| 2,865,438 | A * | 12/1958 | Jan Machielse et al. | 297/217.6 |
| 5,400,230 | A * | 3/1995 | Nicoletti | 362/253 |
| 5,515,249 | A * | 5/1996 | Shiao | 362/119 |
| 6,126,233 | A * | 10/2000 | Gaetano et al. | 297/217.6 |
| 6,199,999 | B1 * | 3/2001 | Cotton, Jr. | 362/131 |
| 6,203,175 | B1 * | 3/2001 | Basacchi | 362/287 |
| 6,394,551 | B1 * | 5/2002 | Beukema | 297/391 |
| 6,779,913 | B2 * | 8/2004 | Niezrecki et al. | 362/473 |
| 7,201,444 | B2 | 4/2007 | Schimmoller | |
| 7,431,393 | B1 * | 10/2008 | Huang | 297/217.6 |
| 7,585,022 | B2 * | 9/2009 | Achilles et al. | 297/188.16 |
| 2004/0037070 | A1 * | 2/2004 | Schubach | 362/190 |
| 2005/0007778 | A1 * | 1/2005 | Lin | 362/250 |
| 2006/0087158 | A1 * | 4/2006 | Kramer et al. | 297/29 |
| 2006/0181120 | A1 | 8/2006 | Schimmoller | |
| 2007/0057545 | A1 * | 3/2007 | Hartenstine et al. | 297/250.1 |
| 2008/0111412 | A1 * | 5/2008 | Woellert et al. | 297/256.1 |
| 2008/0121774 | A1 * | 5/2008 | Johnson | 248/311.2 |
| 2008/0136230 | A1 * | 6/2008 | Ling | 297/217.6 |
| 2008/0246316 | A1 * | 10/2008 | Carine et al. | 297/216.11 |
| 2009/0001789 | A1 * | 1/2009 | Brown et al. | 297/217.6 |
| 2009/0251891 | A1 * | 10/2009 | Hong et al. | 362/183 |
| 2010/0022926 | A1 * | 1/2010 | Kramer et al. | 601/148 |
| 2011/0215620 | A1 * | 9/2011 | Cech et al. | 297/217.2 |

FOREIGN PATENT DOCUMENTS

DE 102 41 132 A1 3/2004
JP 04162301 A * 6/1992

* cited by examiner

*Primary Examiner* — David Dunn
*Assistant Examiner* — David E Allred
(74) *Attorney, Agent, or Firm* — Winston Hsu; Scott Margo

(57) ABSTRACT

A child safety seat includes a seat body, a headrest mechanism, an illumination device, and a power supply device. The headrest mechanism is connected to the seat body. The headrest mechanism includes a main body and a side wing. The side wing is movably connected to the main body. The illumination device is disposed on the side wing. The power supply device is electrically connected to the illumination device and is disposed separating from the side wing. The power supply device is used for providing electrical power to drive the illumination device to emit light.

13 Claims, 4 Drawing Sheets

US 8,113,579 B2

CHILD SAFETY SEAT

CROSS REFERENCE TO RELATED APPLICATIONS

This application claims the benefit of U.S. Provisional Application No. 61/188,721, filed on Aug. 12, 2008 and entitled "Car seat features" and U.S. Provisional Application No. 61/141,227, filed on Dec. 29, 2008 and entitled "Booster", the contents of which are incorporated herein by reference.

BACKGROUND OF THE INVENTION

1. Field of the Invention

The present invention relates to a child safety seat, and more specifically, to a child safety seat having an illumination device.

2. Description of the Prior Art

A child safety seat is a seating device for a child in a car. For meeting children's needs, some accessories are additionally disposed on the child safety seat, such as disposal of an illumination apparatus on the child safety seat for allowing a child sitting thereon to read or providing illumination. The said illumination apparatus commonly includes a light source and a power supply device, which are both disposed on a side wing of a headrest mechanism. The said configuration may allow the illumination apparatus to illuminate a knee area of a child sitting on the child safety seat with no interference, so that the child may read books with sufficient illumination.

However, the aforementioned configuration may have safety concerns when a car accident occurs. That is, since all related components (including the heaviest power supply device) of the illumination apparatus are disposed on the side wing, the overall weight of the side wing is increased accordingly. Therefore, when a car accident occurs, the over-weighted side wing may possibly cause the components of the illumination apparatus to come off the child safety seat so as to endanger a child sitting thereon. Furthermore, the said configuration may also reduce flexibility in industrial design of the child safety seat since all components of the illumination apparatus needs to be disposed on the side wing.

SUMMARY OF THE INVENTION

The present invention provides a child safety seat comprising a seat body; a headrest mechanism connected to the seat body, the headrest mechanism comprising a main body; and a side wing movably connected to the main body; an illumination device disposed on the side wing; and a power supply device electrically connected to the illumination device and being disposed separating from the side wing, the power supply device used for providing electrical power to drive the illumination device to emit light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
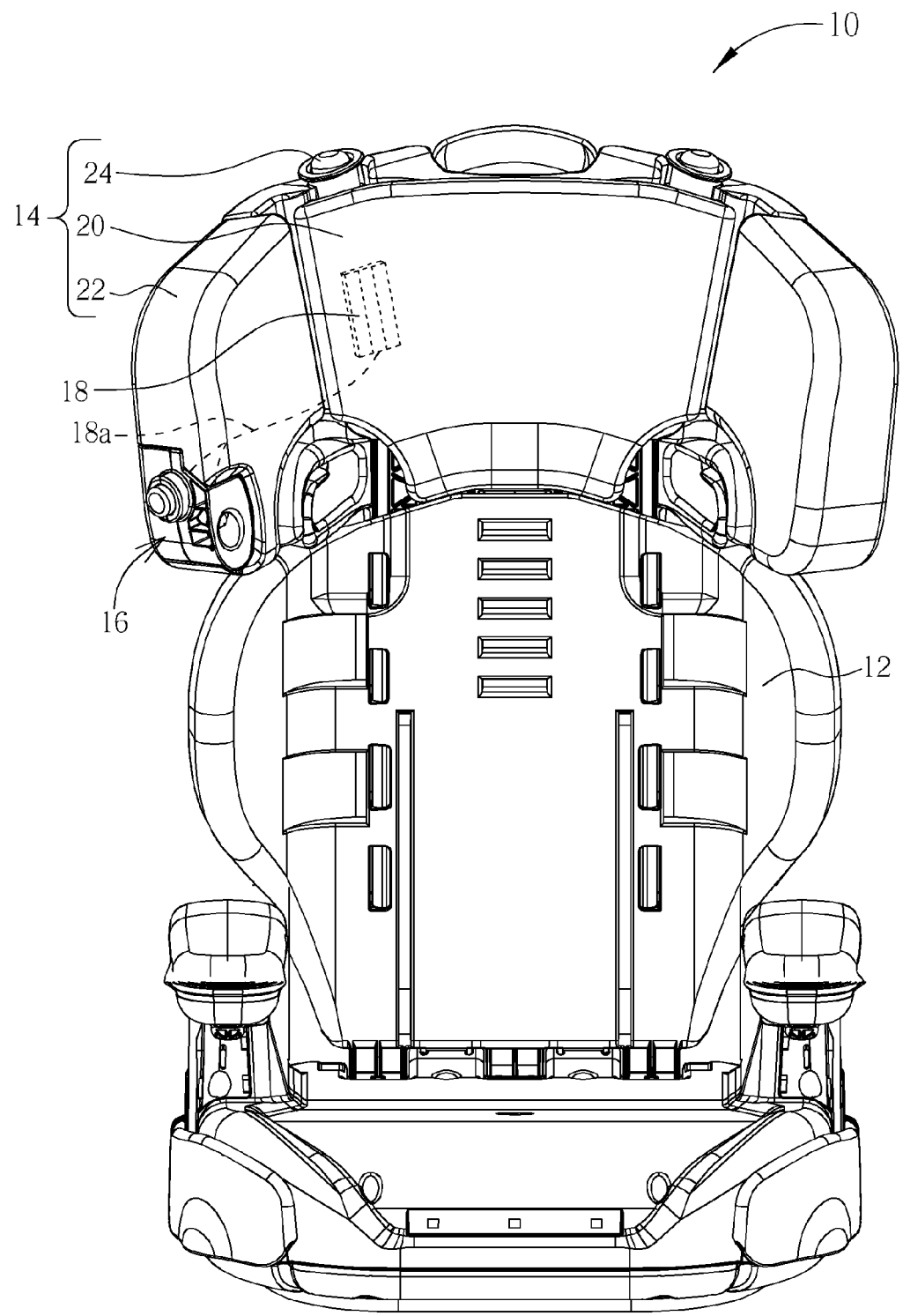
FIG. 1 is a front view of a child safety seat according to a preferred embodiment of the present invention.

Please refer to FIG. 1, which is a front view of a child safety seat 10 according to a preferred embodiment of the present invention. As shown in FIG. 1, the child safety seat 10 includes a seat body 12, a headrest mechanism 14, an illumination device 16, and a power supply device 18. The headrest mechanism 14 is connected to the seat body 12. The headrest mechanism 14 includes a main body 20, at least one side wing 22, and a pivot shaft 24. In this embodiment, two side wings 22 are disposed at two sides of the main body 20 respectively. The pivot shaft 24 is connected to the main body 20 and the side wing 22 so that the side wing 22 is capable of rotating relative to the main body 20. Thus, when a child sits on the child safety seat 10, a user can rotate the side wing 22 relative to the main body 20 manually to adjust an extending width of the side wing 22 for providing the child's head a proper support. Next, as shown in FIG. 1, the illumination device 16 is disposed on one of the side wings 22. The illumination device 16 may also be disposed on each side wing 22 instead, meaning that disposal of the illumination device 16 depends on application needs of the child safety seat 10. The power supply device 18 is electrically connected to the illumination device 16 and is separate from the side wing 22. A method for electrically connecting the power supply device 18 to the illumination device 16 is commonly used in the prior art. For example, as shown in FIG. 1, the power supply device 18 may utilizes a wire 18a to connect to the illumination device 16. The power supply device 18 is a common device for providing electrical power, such as a carbon-zinc battery, an alkaline battery, a rechargeable battery, etc.

Figure 2:
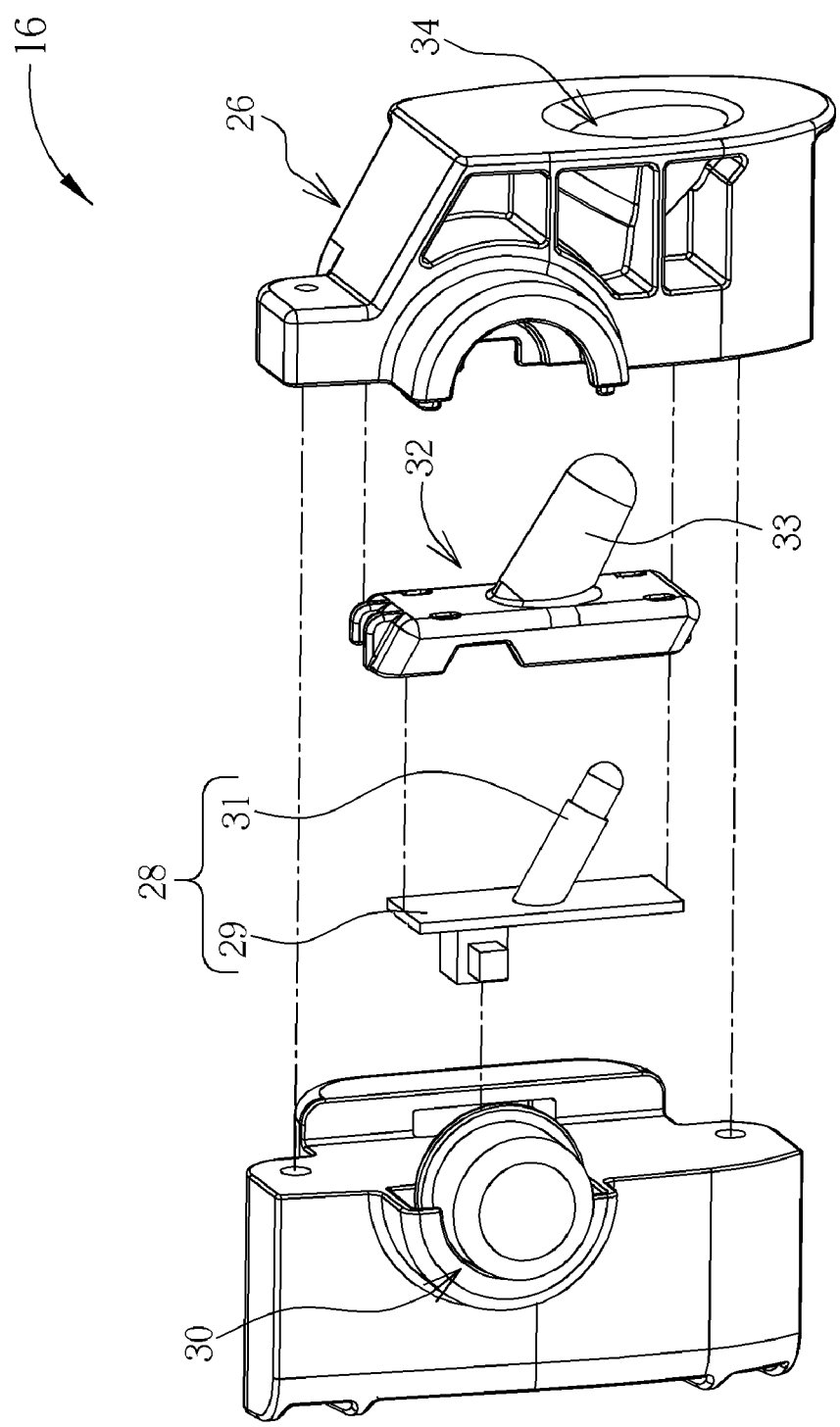
FIG. 2 is an exploded diagram of an illumination device in FIG. 1.

More detailed description for the illumination device 16 and the power supply device 18 is provided as follows. Please refer to FIG. 1 and FIG. 2. FIG. 2 is an exploded diagram of the illumination device 16 in FIG. 1. The illumination device 16 is disposed on the side wing 22. As shown in FIG. 2, the illumination device 16 includes a case 26, a light source 28, a control switch 30, and a transparent cover 32. As shown in FIG. 1, a light outlet 34 is formed on the case 26, wherein an oblique angle is formed between the side wing 22 and the light outlet 34. Thus, light generated by the light source 28 may be guided to the knee area of the child sitting on child safety seat 10 along the oblique angle for allowing the child to read with sufficient illumination. In the present invention, the oblique angle may vary with the light-path design of the illumination device 16. Further, the light source 28 is disposed inside the light outlet 34. The light source 28 includes a circuit board 29 and a light emitting part 31. The light emitting part 31 is protrusively installed on the circuit board 29. As shown in FIG. 2, the light emitting part 31 tilts downwardly relative to the circuit board 31. In the present invention, the light emitting part 31 is preferably an LED (Light Emitting Diode) or a lamp. The light emitting part 31 may also be other type of light source. The control switch 30 is preferably a button switch (but not limited thereto) and is electrically connected to the light source 28. That is, a user may utilize the control switch 30 to control electrical power transmission between the power supply device 18 and the light source 28 for controlling whether the light source 28 emits light or not. The transparent cover 32 covers on the light source 28. As shown in FIG. 2, the transparent cover 32 has a transparent protruding part 33 corresponding to the shape of the light emitting part 31. The light emitting part 31 is disposed inside the transparent protruding part 33. In such a manner, assembly of the light emitting part 31 and the transparent cover 32 may not only be used for protecting the light source 28 and light-focusing, but may also be used for protecting children's eyes from damage of over-bright light. Furthermore, in the present invention, the structure for protecting the light source 28 or light-focusing may be not limited to the transparent cover 32. For example, the present invention may also dispose a lens inside the light outlet 34 for light modulation of the light source 28, or dispose a transparent cap on the light outlet 34 for preventing particles from entering the light outlet 34. As for which structure is utilized, it depends on application needs of the child safety seat 10.

Figure 3:
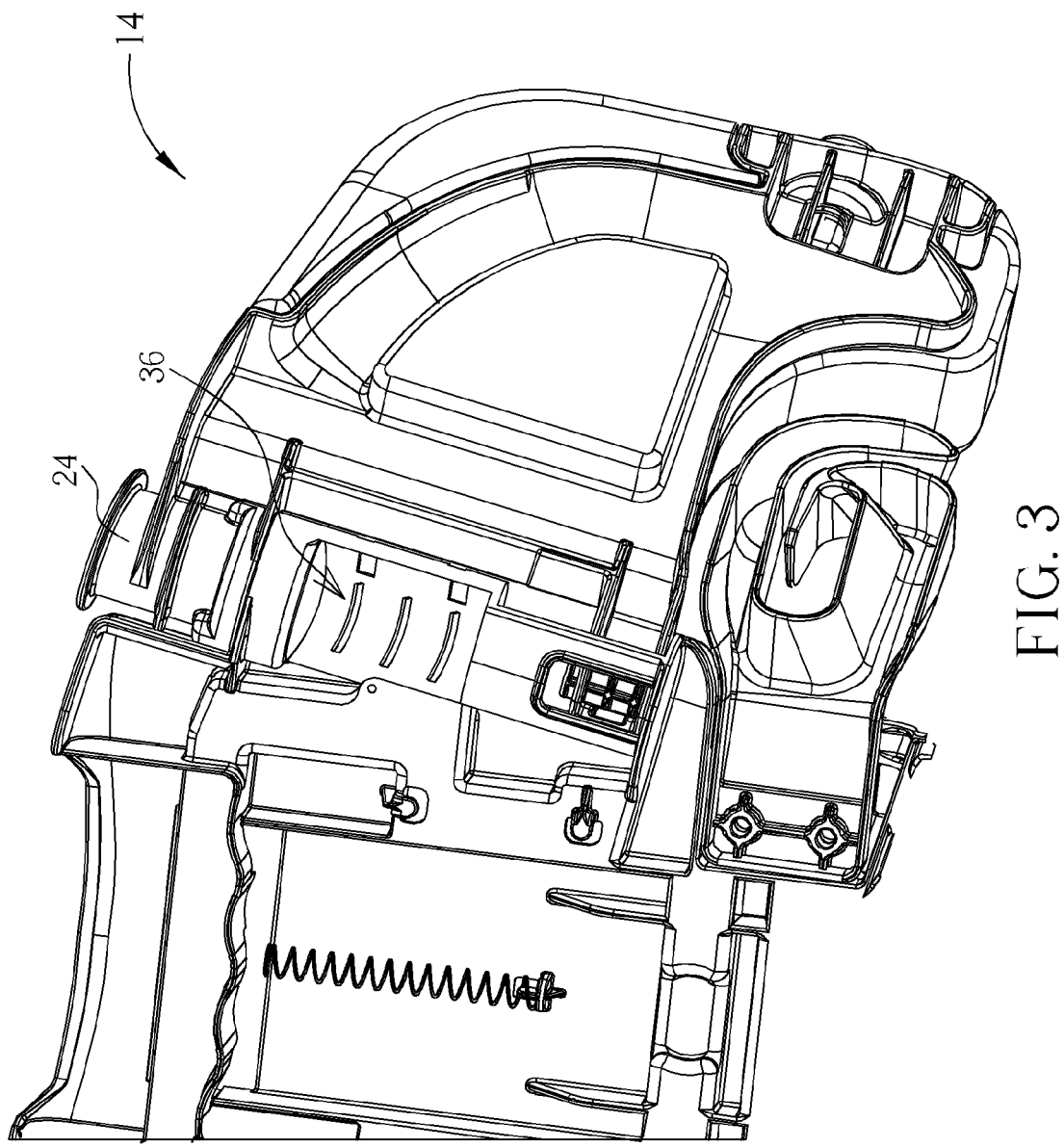
FIG. 3 is an enlarged diagram of a pivot shaft in FIG. 1 without a power supply device installed thereon.
Figure 4:
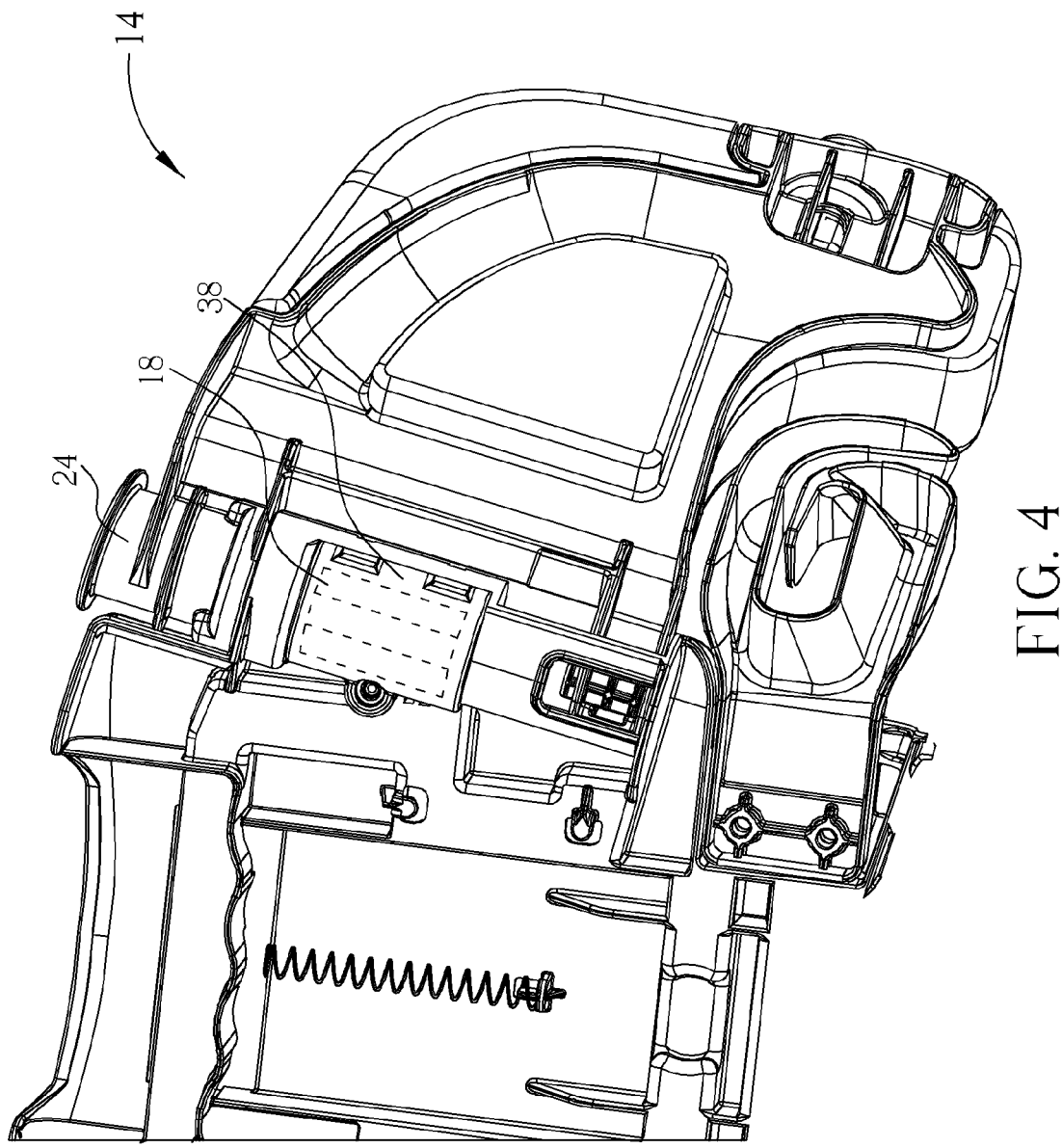
FIG. 4 is an enlarged diagram of the pivot shaft in FIG. 3 with the power supply device installed thereon.

Next, please refer to FIG. 3 and FIG. 4. FIG. 3 is an enlarged diagram of the pivot shaft 24 in FIG. 1 without the power supply device 18 installed thereon. FIG. 4 is an enlarged diagram of the pivot shaft 24 in FIG. 3 with the power supply device 18 installed thereon. As shown in FIG. 3, a containing space 36 is formed on the pivot shaft 24 for containing the power supply device 18. Thus, the power supply device 18 can be installed within the pivot shaft 24 and be further electrically connected to the illumination device 16 by the wire 18a as shown in FIG. 1. Furthermore, as shown in FIG. 4, the headrest mechanism 14 further includes a protection lid 38. The protection lid 38 is used for covering the power supply device 18 when the power supply device 18 is installed within the containing space 36.

In summary, in the present invention, the illumination device 16 and the power supply device 18 are disposed on the side wing 22 and the pivot shaft 24 respectively for reducing the overall weight of the side wing 22. Thus, even if the child safety seat 10 is hit when a car accident occurs, the probability of the said components coming off the child safety seat 10 may be reduced accordingly due to weight reduction of the side wing 22, on which only the illumination device 16 is disposed.

It should be mentioned that disposal of the power supply device 18 on the child safety seat 10 is not limited to the said embodiment. For example, the power supply device 18 may also be installed on other component of the child safety seat 10 instead, such as the seat body 12, the main body 20, etc. That is, on the condition of not increasing the overall weight of the side wing 22 with the illumination device 16 installed thereon and being capable of electrically connecting to the illumination device 16 via a wire, disposal of the power supply device 18 on the child safety seat 10 is not limited. In addition, as shown in FIG. 1, the illumination device 16 is fixed to the side wing 22, but is not limited thereto. For example, the illumination device 16 may also be rotatably disposed on the side wing 22 instead. In such a manner, a user may not only utilize rotation of the side wing 22 relative to the main body 20 to adjust a projection position of light generated by the light source 28, but may also utilize rotation of the illumination device 16 relative to the side wing 22 to adjust an incident angle of the light. That is, via the said structural design, the user may control the projection position of the light more precisely.

Compared with the prior art, in which all components of an illumination apparatus are disposed on a side wing, the present invention involves disposing a power supply device on a component of a child safety seat (e.g. the said pivot shaft 24) different from the side wing. Therefore, the overall weight of the side wing may be reduced accordingly. In such a manner, the present invention may not only reduce the probability of a child being hit by a component of the illumination apparatus which comes off the side wing during a car accident, but may also increase flexibility in industrial design of the child safety seat.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
    a seat body;
    a headrest mechanism connected to the seat body, the headrest mechanism comprising:
        a main body;
        a side wing movably connected to the main body; and
        a pivot shaft connected to the main body and the side wing for causing the side swing to rotate relative to the main body;
    an illumination device disposed on the side wing; and
    a power supply device electrically connected to the illumination device, the power supply device disposed in the pivot shaft and separating the main body from the side wing, the power supply device being used for providing electrical power to drive the illumination device to emit light.

2. The child safety seat of claim 1, wherein a containing space is formed on the pivot shaft for containing the power supply device.

3. The child safety seat of claim 1, wherein the headrest mechanism further comprises a protection lid disposed on the pivot shaft for covering the power supply device.

4. The child safety seat of claim 1, wherein the power supply device is a battery.

5. The child safety seat of claim 1, wherein the illumination device comprises:
    a case, a light outlet being formed on the case;
    a light source disposed inside the case, light generated by the light source emitting from the light outlet; and
    a control switch electrically connected to the light source and the power supply device for controlling electrical power transmission between the light source and the power supply device.

6. The child safety seat of claim 5, wherein the illumination device further comprises a transparent cover for covering the light source.

7. The child safety seat of claim 6, wherein the light source comprising a circuit board and a light emitting part, and the light emitting part is protrusively installed on and tilts downwardly relative to the circuit board.

8. The child safety seat of claim 7, wherein the transparent cover has a transparent protruding part corresponding to the shape of the light emitting part, and the light emitting part is disposed inside the transparent protruding part.

9. The child safety seat of claim 7, wherein the light emitting part is an LED (Light Emitting Diode) or a lamp.

10. The child safety seat of claim 5, wherein the illumination device further comprises a lens disposed inside the light outlet for light modulation of the light source.

11. The child safety seat of claim 5, wherein the illumination device further comprises a transparent cap disposed on the light outlet.

12. The child safety seat of claim 5, wherein the control switch is a button switch.

13. The child safety seat of claim 1, wherein the illumination device is rotatably disposed on the side wing.

\* \* \* \* \*